Aug. 16, 1966 G. E. LEMIEUX 3,266,608
FLUID PRESSURE OPERATED FRICTION CLUTCH
Filed April 13, 1965 2 Sheets-Sheet 2

INVENTOR:
GEORGE E. LEMIEUX
BY
ATTORNEYS.

United States Patent Office 3,266,608
Patented August 16, 1966

3,266,608
FLUID PRESSURE OPERATED FRICTION CLUTCH
George E. Lemieux, Dearborn Heights, Mich., assignor to Ford Motor Company, Dearborn, Mich., a corporation of Delaware
Filed Apr. 13, 1965, Ser. No. 447,735
8 Claims. (Cl. 192—85)

My invention relates generally to fluid pressure operated clutches, and more particularly to fluid pressure operated friction disc clutches that are adapted for use in a multiple speed ratio power transmission mechanism for an automotive vehicle driveline.

In automotive vehicle drivelines, it is common practice to employ a planetary gear system having gear elements that define plural torque delivery paths between the internal combustion engine of the vehicle and the vehicle traction wheels. The relative motion of the gear elements is controlled by clutch and brake servos. A power input shaft for the gearing is connected directly to the turbine of a hydrokinetic torque converter mechanism. The crankshaft of the internal combustion engine is connected to the impeller of the torque converter mechanism.

The power input shaft usually is connected to a power input element of the gearing by means of a selectively engageable forward drive friction clutch. Either of two forward drive speed reduction ratios can be obtained as the forward clutch is applied by employing a low-speed ratio reaction brake and an intermediate-speed ratio reaction brake. A high-speed ratio can be obtained by engaging a direct drive clutch and releasing the reaction brakes as the forward drive clutch continues to be applied. The direct drive clutch then is effective to establish a connection between the turbine driven power input shaft and a second power input element of the gearing, thus causing the gearing to rotate with a 1:1 speed ratio.

The driveline can be conditioned for neutral by disengaging both clutches. This is done by moving a range selector manual valve to a position that will interrupt distribution of control pressure to the forward drive clutch. The manual valve is situated in conduit structure that establishes in part a fluid connection between the working pressure chamber of the forward clutch and a fluid pressure source which may be an engine driven positive displacement pump.

In commercially available embodiments of transmissions of this general type, the forward drive clutch comprises a clutch drum that is connected drivably to the turbine shaft. The drum carries externally splined friction discs which are situated in alternating assembled relationship with respect to internally splined clutch discs carried by a clutch element which in turn is connected to a first power input element of the gear system. The clutch drum defines an annular cylinder within which is positioned an annular piston. In order to multiply the clutch applying force that may be developed by the control pressure on the piston, there is included a Belleville spring anchored at its outer periphery on the clutch drum. The piston engages the inner periphery of the Belleville spring. An intermediate portion of the spring engages a pressure plate that forms a part of the friction disc assembly of the forward clutch.

The Belleville spring acts to multiply the force on the piston. It acts also as a return spring for the piston which allows the piston to be returned to a clutch disengaging position as the control pressure is exhausted from the clutch working chamber.

During operation of the mechanism in neutral, the forward clutch is exhausted. There exists, however, a residual supply of oil in the clutch working chamber although it is not pressurized by the pressure source. If the engine is speeded-up under these conditions, the clutch drum will be caused to rotate at a relatively high speed. This may tend to develop a centrifugal pressure head in the clutch chamber for the forward clutch which is sufficient to cause the forward clutch discs to engage slightly, thereby partially completing a forward drive powertrain through the transmission system when torque delivery is not desired. It is an object of my invention to overcome this centrifugal pressure buildup by providing a valve controlled orifice arrangement that forms a part of the forward clutch disc assembly. This arrangement will cause the centrifugal pressure build-up to be avoided although it will not adversely influence the clutch performance during normal engagement and release of the forward clutch upon movement of the previously described manual valve.

This same centrifugal pressure build-up condition may exist when the transmission is conditioned for reverse drive operation. Under these conditions, the second friction clutch is applied and the reverse brake band also is applied to provide the necessary torque reaction for reverse torque delivery. The forward clutch normally is released. If the driveline is operated in reverse drive at high engine speeds, it is possible that the centrifugal pressure build-up will occur also in the forward clutch thereby causing slippage of the friction discs of the forward clutch. This condition would tend to accelerate disc wear. The provision of a clutch structure that will avoid this centrifugal pressure build-up during reverse drive operation is another object of my invention.

The transmission may be conditioned for forward torque delivery following idling operation by adjusting the manual valve from the so-called neutral position to the forward drive range position. This causes pressure distribution to take place from the engine driven positive displacement pump to the forward clutch. It has been found in actual practice that the clutch engages as the manual valve is shifted from the neutral position to the forward drive position with an undesirable harshness. This is due to the fact that the transmission driveline does not deliver torque under these conditions, which makes it possible to lock up the friction discs with a minimum control pressure in the forward clutch servo.

According to a principal feature of my invention, provision is made for eliminating the harshness normally associated with application of the forward drive clutch. This is accomplished by providing a flow restricting orifice in the clutch piston which establishes controlled communication between the fluid pressure working chamber of the clutch servo and the exhaust region. The orifice is controlled by means of a valve element that responds to deflection of the Belleville spring upon application of the clutch. The provision of a clutch control of this type is another object of my invention.

It is another object of my invention to provide a clutch of the type above set forth wherein the valve element associated with the orifice is capable of providing a controlled restriction, the degree of restriction being proportional to the degree of pressure build-up in the clutch servo.

For the purpose of describing a preferred embodiment of my invention, reference will be made to the accompanying drawings, wherein.

Figure 1:
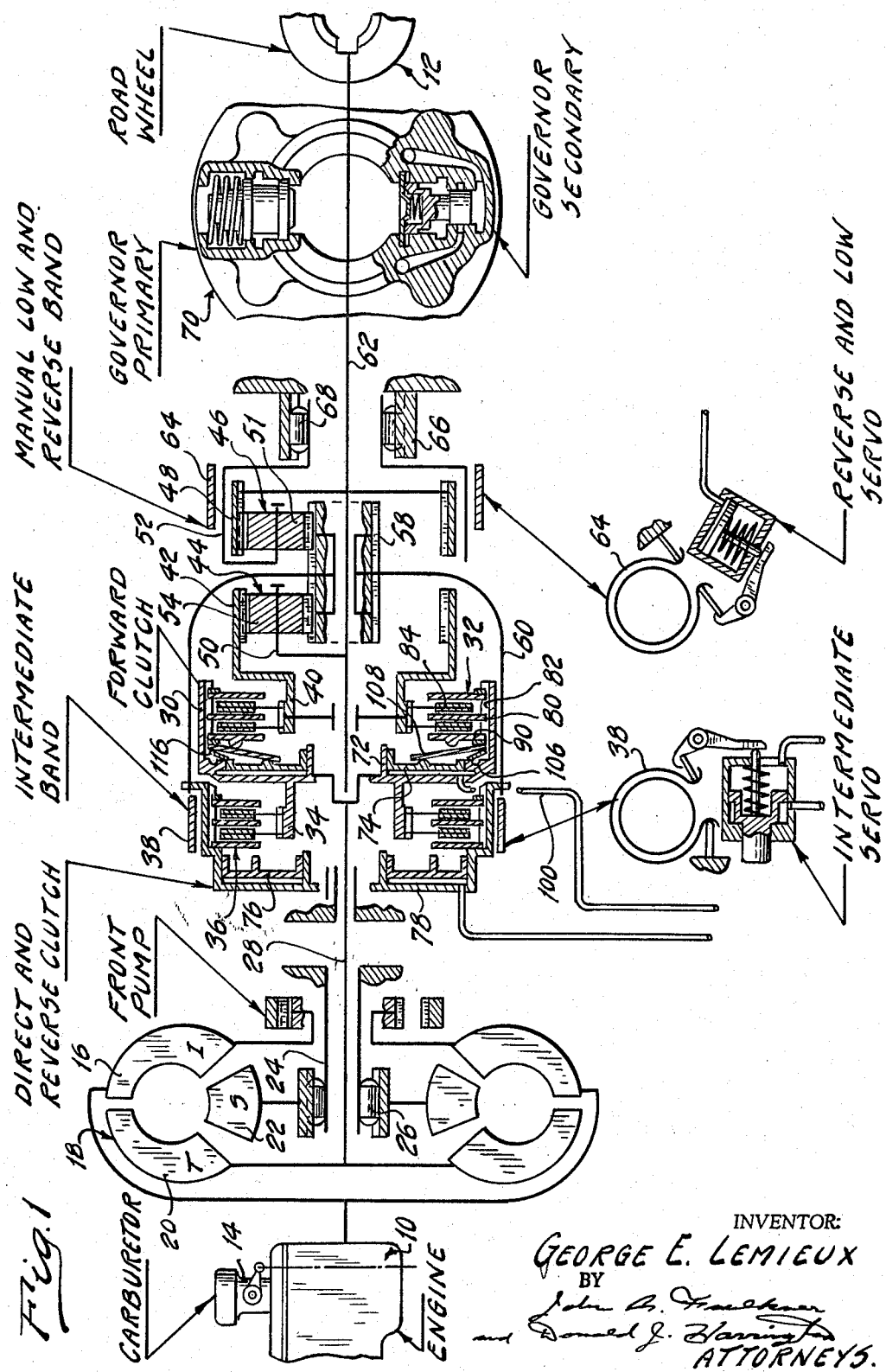
FIGURE 1 shows in schematic form a power transmission mechanism capable of embodying my improved clutch structure.

In FIGURE 1, numeral 10 designates an internal combustion vehicle engine in an automotive vehicle driveline.

Numeral 12 designates the road wheels for the vehicle. The engine 10 is supplied with an air-fuel mixture by means of a fuel-air carburetor and an engine intake manifold shown in part at 14.

The crankshaft of the engine is connected drivably to the impeller 16 of a hydrokinetic torque converter mechanism 18. This mechanism includes also a bladed turbine 20 and a bladed stator 22. The impeller 16, the bladed turbine 20 and the stator 22 are situated in toroidal fluid flow relationship in a common torus circuit in the usual fashion.

The stator 22 is adapted to freewheel in the direction of motion of the impeller 16 during coupling operation of the converter mechanism 18. It is inhibited from rotating in the opposite direction, however, by an overrunning brake 24 which establishes a one-way torque delivery path between the stator 22 and the stationary sleeve shaft 24 which is connected to the transmission housing. The overrunning brake is shown schematically at 26.

Turbine 20 is connected directly to turbine shaft 28. A clutch drum 30 of the forward clutch 32 is connected to the turbine shaft 28 directly. Another clutch element 34, which is connected directly to the drum 30, forms a part of a direct and reverse clutch 36. This clutch is defined in part by a brake drum about which is positioned an intermediate speed ratio brake band 38. This band may be applied and released by an intermediate servo schematically illustrated in FIGURE 1.

The forward clutch 32 includes also a clutch element 40 which carries externally splined clutch discs subsequently to be described. It is connected directly to ring gear 42 of a first planetary gear unit 44. The second simple planetary gear unit 46 includes a ring gear 48, a carrier 52 and planetary pinions 51 rotatably journalled upon the carrier 52. Pinions 51 drivably engage ring gear 48.

Gear unit 44 includes a carrier 50 and planetary pinions 54 which are journalled thereupon. A first long sun gear 58 which is common to both gear units 44 and 46 drivably engage pinions 54 and the pinions 51. Carrier 50 and ring gear 48 are connected directly to a power output shaft 62. Sun gear 58 is connected directly to the drum for the direct and reverse clutch 36 by means of a drive shell 60 which surrounds a forward clutch and the gear unit 44.

Carrier 52 defines a friction brake drum upon which is positioned a friction brake band 64. This band is used during manual-low speed ratio operation and during reverse drive. Carrier 52 is anchored also by an overrunning brake which comprises overrunning brake element 68 and outer race 66, the latter being connected directly to the transmission housing. The inner race for the overrunning brake forms a part of carrier 52.

A compound governor valve assembly 70 is drivably connected to the shaft 62. It rotates with the shaft and establishes a pressure signal that is proportional in magnitude to the driven speed of shaft 62. Shaft 62 also is connected drivably to the road wheels 12 through a driveline differential and axle assembly.

Brake band 64 is applied and released by means of a reverse and low servo. The intermediate servo, the reverse-and-low servo and the servos of the two clutches form a part of an automatic control valve system not shown. This system is supplied with pressure by a front pump illustrated in FIGURE 1 schematically. This pump is connected drivably to the impeller 16. A manual valve, which also forms a part of the control valve system, selects the drive range that is appropriate and controls distribution of pressure to the forward drive clutch 32. The servo for the forward drive clutch 32 includes an annular cylinder 72 which is defined in part by the drum 30. An annular piston 74 is situated within the annular cylinder and cooperates therewith to define a fluid pressure chamber. In a similar fashion, an annular piston 76 is slidably positioned within an annular cylinder which is defined by the brake drum for the intermediate speed ratio brake band 38. This piston and cylinder cooperate to define a pressure chamber that is supplied with fluid pressure through a feed passage as indicated.

To establish low-speed ratio operation, forward clutch 32 is applied. Turbine torque then is transferred directly to the ring gear 42. Since the power output shaft 62 tends to resist rotation, the carrier 50 resists the forward driving torque applied to the ring gear 42. This causes sun gear 58 to rotate in a reverse direction. This reverse motion causes forward driving motion of the ring gear 48 since carrier 52, which acts as a reaction member, is held stationary by the overrunning brake shown in part at 68. Thus a split torque delivery path between the turbine shaft 28 and the power output shaft 62 is provided by the gear units as carrier 50 and ring gear 48 distribute driving torque to shaft 62.

To establish intermediate, forward-drive operation, brake band 38 is applied. This anchors sun gear 58 so that it can function as a reaction point. Carrier 50 now is driven at an increased speed. This motion is transferred to a power output shaft 62 and the overrunning brake shown in part at 68 begins to freewheel. The gear unit 46 forms no part of the intermediate speed-ratio, torque delivery path.

High-speed, direct drive operation is obtained by releasing the brake 38 and applying the clutch 36. Clutch 32 is applied during forward drive operation in each of the three speed ratios. When both clutches are applied, the elements of the gear system rotate in unison, thus establishing a 1:1 speed ratio between shafts 28 and 62.

Reverse drive operation is obtained by applying brake band 64, releasing clutch 32 and applying clutch 36. Thus shaft 28 becomes connected directly to the sun gear 58. Carrier 52 acts as a reaction member as sun gear 58 drives the ring gear 48 in a reverse direction. The reverse motion of the sun gear 48 is transferred to the power output shaft 62. The gear unit 44 forms no part of the torque delivery path during reverse drive operation.

Continuous operation in the low-speed ratio range can be obtained by applying brake band 64, releasing brake band 38 and releasing clutch 36 as clutch 32 is applied. The torque delivery path previously described for low-speed ratio operation again is established although the function of the overrunning brake shown in part at 68 is supplemented by the friction brake band 64. The driveline then is capable of accommodating coasting torque delivery from shaft 62 to shaft 28 as well as driving torque delivery from shaft 28 to shaft 62.

Figure 2:
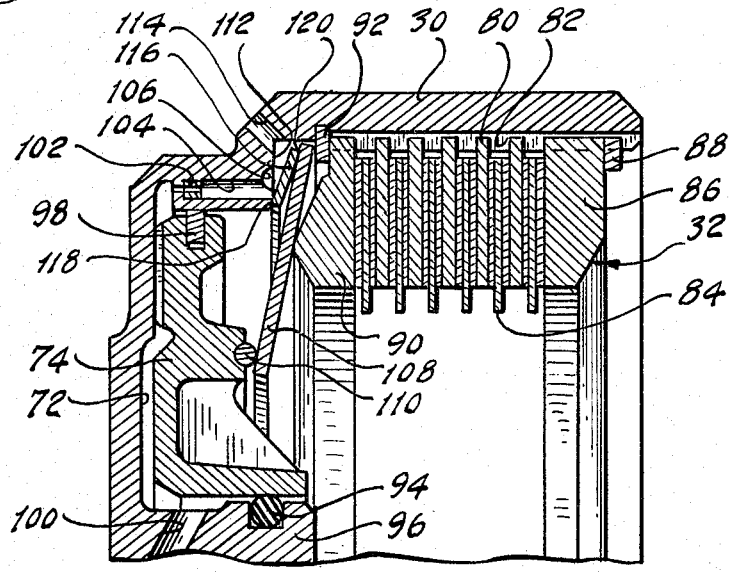
FIGURE 2 is a partial cross sectional view of a forward clutch shown schematically in FIGURE 1.
Figure 3:
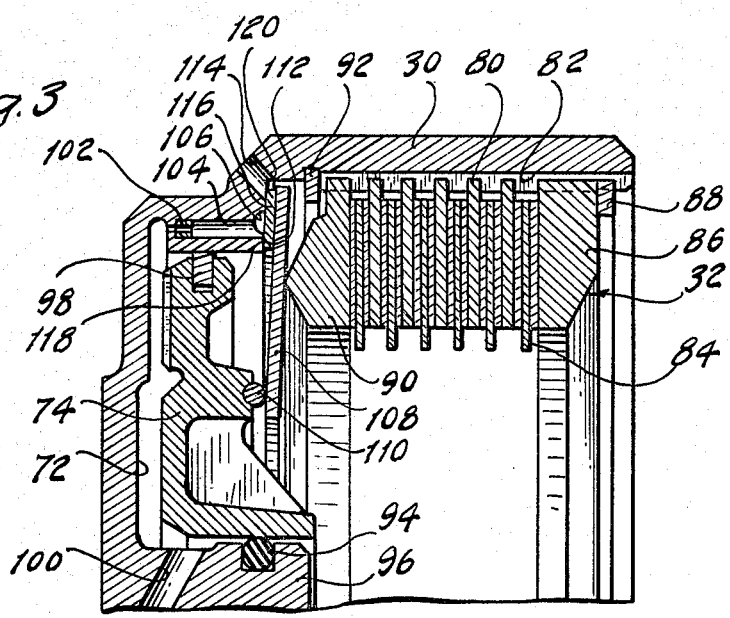
FIGURE 3 is a view similar to FIGURE 2 showing the piston of the FIGURE 2 construction in the applied position.

In FIGURES 2 and 3 I have illustrated in more particular detail the forward-drive clutch construction. It includes a series of externally splined friction discs 80 which are splined to the internally splined periphery 82 of the clutch drum 30. Internally splined clutch discs 84 are situated in interdigital relationship with respect to the discs 80. These are connected to the clutch element 40 as indicated earlier. A reaction ring 86 is externally splined to the interior periphery 82 of the drum 30 and is held axially fast by a snap ring 88. A clutch pressure plate 90 also is externally splined to the internally splined periphery of the clutch drum 30. It is adapted to shift axially with respect to the clutch drum 30 to cause frictional engagement of the friction discs 80 and 84. Located at one side of the internally splined periphery of the drum 30 is a snap ring 92 which is seated within a snap ring groove formed in the drum 30.

An O-ring seal 94 is situated within an O-ring groove formed in the hub 96 of the drum 30. It provides a sliding seal with respect to the inner periphery of the annular piston 74. The outer periphery of the annular piston 74 is formed with another seal groove which receives a seal element 98.

The fluid pressure chamber defined by the piston 74 and the cylinder 72 communicates with the fluid pressure feed passage 100. A fluid flow restricting orifice 102 is located within a fluid drain passage 104 formed in the outer periphery of the annular cylinder 72. Passage 104 communicates with an annulus 106 situated at the outer periphery of the cylinder 72.

A Belleville spring 108 is located between the piston 74 and the pressure plate 90. The outer margin of the Belleville spring 108 rests against snap ring 92 and its inner margin engages a ring 110 carried by an intermediate portion of the piston 74. The ring 110 is seated in an annular groove of semi-circular cross section. It provides line contact with the inner margin of the Belleville spring 108.

The orifice 104 terminates in the annulus 106 which in turn is situated in a boss 112 formed in the drum 30. An annular chamber is defined by the boss 112 and a snap ring 92. Passage 114 connects this annular recess with the external exhaust region.

Located in this recess adjacent boss 112 is an annular seal plate 116 which is dished as indicated. The seal plate 116 encircles the axis of clutch. At its inner margin 118 plate 116 engages the boss 112. The outer margin of the seal plate 116 engages the outer periphery of Belleville spring 108 as indicated at 120.

The seal plate 116 is in the form of a light Belleville spring which may be deflected from the dished position shown to a flat position. The sealing surface of boss 112 can be made slightly conical, if desired, to facilitate sealing. When it assumes a flat position, the annular surface of boss 112 then seals the annulus 106 thereby blocking fluid flow through the passage 104.

When the piston 74 assumes the disengaged position shown in FIGURE 2, and when fluid pressure is introduced to passage 100, a pressure build-up tends to occur in the clutch working chamber. Fluid flow through orifice 102 then will begin to take place, and the fluid will be exhausted through the annulus 106 and the drain passage 114. The force produced by this pressure build-up will be transmitted to the inner margin of the Belleville spring 108. The pressure plate 90 engages the Belleville spring at a location intermediate its inner and outer peripheries. Thus the outer margin of the Belleville spring will engage the outer margin 120 of the seal plate 116 and deflect the plate until it bottoms against the boss 112. This restricts the fluid flow through the orifice 102. At the same time, a reaction point for the Belleville spring 108 is established as a clutch applying force is distributed to the pressure plate 90.

A continued pressure build-up in the clutch pressure chamber will result in an increased force on the inner margin of the Belleville spring. This in turn produces an increased sealing force on the seal plate 116. This results in a further reduction in the flow through the orifice 102. The orificing action continues until full clutch engaging pressure is reached, at which time the seal plate 116 completely seals the annulus 106. It is at this time that the clutch becomes fully applied. Sudden clutch application is avoided by reason of the cushioning action that accompanies this orificing characteristic.

When the control valve system exhausts pressure from the passage 100, the Belleville spring 108 tends to return the piston 74 to the clutch disengaging position shown in FIGURE 2. As will be apparent from the foregoing description of the gear system of FIGURE 1, drum 30 contines to rotate when the transmission operates in neutral or when it operates in reverse. This tends to create a centrifugal pressure build-up in the outer regions of the working chamber of the clutch 32. But since the orifice 102 is opened under these conditions, a centrifugal pressure build-up is avoided as the pressurized fluid is exhausted through orifice 102 and through the open annulus 106 to the drain passage 114. Undesired dragging of the forward clutch during neutral and reverse operation is avoided.

Having thus described a preferred form of my invention, what I claim and desire to secure by U.S. Letters Patent is:

1. A fluid pressure operated friction clutch comprising a clutch drum, first clutch discs carried by said drum, second clutch discs carried by other portions of said clutch assembly, an annular cylinder defined by said drum, an annular piston situated within said clutch drum and cooperating therewith to define a fluid pressure chamber, a clutch pressure plate situated adjacent said discs, a Belleville spring washer located within said drum with its inner margin engaging said piston and its outer margin located at a radially outward location, and a flow restricting orifice formed in said cylinder at a radially outward location, a deformable seal situated adjacent said flow restricting orifice and adapted to register therewith, the outer margin of said Belleville spring being engagable with said seal to move said seal into registry with said orifice thereby progressively sealing the same as fluid pressure is developed in said working chamber, said pressure plate engaging said Belleville spring at a location intermediate its inner and outer peripheries.

2. In a torque delivery gear system a friction disc clutch assembly adapted to connect and disconnect two torque delivery elements thereof, said clutch disc assembly comprising a rotatable clutch drum, externally splined clutch discs carried by said drum, internally splined clutch discs carried by a driven portion of said clutch disc assembly, a pressure plate situated adjacent said discs adapted to create a clutch engaging force thereon, an annular cylinder defined by said drum, an annular piston situated in said cylinder and cooperating therewith to define a fluid pressure chamber, passage means for feeding control pressure to said chamber, an annular boss having an annular sealing surface carried by said drum, a flow restricting orifice in said boss establishing fluid communication between said chamber and an exhaust region, a seal element situated adjacent said boss surface and adapted to register with said orifice, a dished Belleville spring in said drum having an inner periphery engageable with said piston, an outer periphery of said Belleville spring being situated directly adjacent said seal element and engagable therewith, said pressure plate engaging said Belleville spring at a location intermediate its inner and outer peripheries, the outer periphery of said Belleville spring being adapted to apply a sealing force to said sealing element as pressure builds up in said chamber thereby progressively restricting said flow restricting orifice to a degree that is dependent upon the pressure build-up in said chamber.

3. A fluid pressure operated friction clutch comprising a clutch drum, first clutch discs carried by said drum, second clutch discs carried by other portions of said clutch assembly, an annular cylinder defined by said drum, an annular piston situated within said clutch drum and cooperating therewith to define a fluid pressure chamber, a clutch pressure plate situated adjacent said discs, a Belleville spring washer located within said drum with its inner margin engaging said piston and its outer margin located at a radially outward location, a flow restricting orifice formed in said cylinder at a radially outward location and communicating with an exhaust region, a deformable seal situated adjacent said flow restricting orifice and adapted to register therewith, the outer margin of said Belleville spring being engageable with said seal to move said seal into registry with said orifice thereby progressively sealing the same as fluid pressure is developed in said working chamber, said pressure plate engaging said Belleville spring at a location intermediate its inner and outer peripheries, said sealing element including a spring disc portion adapted to be urged normally out of registry with said flow restricting orifice whereby said chamber is open to said exhaust region through said flow restricting orifice when said clutch is disengaged.

4. In a torque delivery gear system a friction disc clutch assembly adapted to connect and disconnect two torque delivery elements thereof, said clutch disc assembly comprising a rotatable clutch drum, externally splined clutch discs carried by said drum, internally splined clutch discs carried by a driven portion of said clutch disc assembly, a pressure plate situated adjacent said discs and adapted to apply a clutch engaging force thereto, an annular cylinder defined by said drum, an annular piston situated in said cylinder and cooperating therewith to define a fluid pressure chamber, passage means for feeding control pressure to said chamber, an annular boss having an annular sealing surface carried by said drum, a flow restricting orifice in said boss establishing fluid communication between said chamber and an exhaust region, a seal element situated adjacent said boss surface and adapted to engage the same upon registry with said orifice, a dished Belleville spring in said drum having an inner periphery engageable with said piston, the outer periphery of said Belleville spring being situated directly adjacent said seal element and engageable therewith, said pressure plate engaging said Belleville spring at a location intermediate its inner and outer peripheries, the outer periphery of said Belleville spring being adapted to apply a sealing force to said sealing element as pressure builds up in said chamber thereby progressively restricting said flow restricting orifice to a degree that is dependent upon the pressure build-up in said chamber, said sealing element being in the form of a spring that is urged normally out of registry with said flow restricting orifice whereby said chamber is open to said exhaust region through said flow restricting orifice when said clutch is disengaged.

5. A fluid pressure operated friction clutch comprising a clutch drum, first clutch discs carried by said drum, second clutch discs carried by other portions of said clutch assembly, an annular cylinder defined by said drum, an annular piston situated within said clutch drum and cooperating therewith to define a fluid pressure chamber, a clutch pressure plate situated adjacent said discs, a Belleville spring washer located within said drum with its inner margin engaging said piston and its outer margin located at a radially outward location, a flow restricting orifice formed in said cylinder at a radially outward location, a deformable seal situated adjacent said flow restricting orifice and adapted to register therewith, the outer margin of said Belleville spring being engageable with said seal and engageable therewith to move said seal into registry with said orifice thereby progressively sealing the same as fluid pressure is developed in said working chamber, said pressure plate engaging said Belleville spring at a location intermediate its inner and outer peripheries, said seal element being in the form of an annular dished seal plate having a first margin thereof engageable with said clutch drum and a second margin thereof engageable with the outer periphery of said Belleville spring, said seal plate being deflected to a flat position in sealing registration with said flow restrictnig orifice when fluid pressure is applied to said clutch chamber.

6. In a torque delivery gear system a friction disc clutch assembly adapted to connect and disconnect two torque delivery elements thereof, said clutch disc assembly comprising a rotatable clutch drum, externally splined clutch discs carried by said drum, internally splined clutch discs carried by a driven portion of said clutch disc assembly, a pressure plate situated adjacent said discs adapted to apply a clutch engaging force thereto, an annular cylinder defined by said drum, an annular piston situated in said cylinder and cooperating therewith to define a fluid pressure chamber, a passage means for feeding control pressure to said chamber selectively, an annular boss having an annular sealing surface carried by said drum, a flow restricting orifice in said boss establishing fluid communication between said chamber and an exhaust region, a seal element situated adjacent said boss surface, a dished Belleville spring in said drum having an inner periphery engageable with said piston, the outer periphery of said Belleville spring being situated directly adjacent said seal element and engageable therewith, said pressure plate engaging said Belleville spring at a location intermediate its inner and outer peripheries, the outer periphery of said Belleville spring being adapted to apply a sealing force to said sealing element as pressure builds up in said chamber thereby progressively restricting said flow restricting orifice to a degree that is dependent upon the pressure build-up in said chamber, said seal element being in the form of an annular dished seal plate having a first margin thereof engageable with said clutch drum and a second margin thereof engageable with the outer periphery of said Belleville spring, said seal plate being deflected to a flat position in sealing registration with said flow restricting orifice when fluid pressure is applied to said clutch chamber.

7. A fluid pressure operated friction clutch comprising a clutch drum, first clutch discs carried by said drum, second clutch discs carried by other portions of said clutch assembly, an annular cylinder defined by said drum, an annular piston situated within said clutch drum and cooperating therewith to define a fluid pressure chamber, a clutch pressure plate situated adjacent said discs, a Belleville spring washer located within said drum with its inner margin engaging said piston and its outer margin located at a radially outward location, a flow restricting orifice formed in said cylinder at a radially outward location, a deformable seal situated adjacent said flow restricting orifice and adapted to register therewith, the outer margin of said Belleville spring being engageable with said seal and engageable therewith to move said seal into registry with said orifice thereby progressively sealing the same as fluid pressure is developed in said working chamber, said pressure plate engaging said Belleville spring at a location intermediate its inner and outer peripheries, said sealing element including spring portions adapted to urge the same normally out of registry with said flow restricting orifice whereby said chamber is open to said exhaust region through said flow restricting orifice when said clutch is disengaged, said seal element being in the form of an annular dished seal plate having a first margin thereof engageable with said clutch drum and a second margin thereof engageable with the outer periphery of said Belleville spring, said seal plate being deflected to a flat position in sealing registration with said flow restricting orifice when fluid pressure is applied to said clutch chamber.

8. In a torque delivery gear system a friction disc clutch assembly adapted to connect and disconnect two torque delivery elements thereof, said clutch disc assembly comprising a rotatable clutch drum, externally splined clutch discs carried by said drum, internally splined clutch discs carried by a driven portion of said clutch disc assembly, a pressure plate situated adjacent said discs adapted to apply a clutch engaging force thereto, an annular cylinder defined by said drum, an annular piston situated in said cylinder and cooperating therewith to define a fluid pressure chamber, passage means for feeding control pressure to said chamber selectively, an annular boss having an annular sealing surface carried by said drum, a flow restricting orifice in said boss establishing fluid communication between said chamber and an exhaust region, a seal element situated adjacent said boss surface and adapted to engage the same and in registry with said orifice, a dished Belleville spring in said drum having an inner periphery engageable with said piston, the outer periphery of said Belleville spring being situated directly adjacent said seal element and engageable therewith, said pressure plate engaging said Belleville spring at a location intermediate its inner and outer peripheries, the outer periphery of said Belleville spring being adapted to apply a sealing force to said sealing element as pressure builds up in said chamber thereby progressively restricting said flow restricting orifice to a degree that is dependent upon the pressure build-up in said chamber, said sealing element including spring portions adapted to urge the same normally out of registry with said flow restricting orifice whereby said chamber is open to said exhaust region through said flow restricting orifice when said clutch is disengaged, said seal element being in the form of an annular dished seal plate having a first margin thereof engageable with said clutch drum and a second margin thereof engageable with the outer periphery of said Belleville spring, said seal plate being deflected to a flat position in sealing registration with said flow restricting orifice when fluid pressure is applied to said clutch chamber.

References Cited by the Examiner

UNITED STATES PATENTS

| | | | |
|---|---|---|---|
| 2,462,825 | 2/1949 | Zimmerman et al. | 192—85 |
| 2,720,866 | 10/1955 | Maki et al. | 192—85 X |
| 2,876,743 | 3/1959 | Maki | 192—85 X |

DAVID J. WILLIAMOWSKY, *Primary Examiner.*

A. McKEON, *Assistant Examiner.*